(12) United States Patent
Jens et al.

(10) Patent No.: US 7,214,334 B2
(45) Date of Patent: May 8, 2007

(54) CONTINUOUS MOLDING OF FASTENER PRODUCTS

(75) Inventors: Stephen C. Jens, Winchester, MA (US); William Clune, Concord, NH (US); George A. Provost, Litchfield, NH (US); James W. Babineau, Newton, MA (US)

(73) Assignee: Velcro Industries B.V., Curacao (AN)

( * ) Notice: Subject to any disclaimer, the term of this patent is extended or adjusted under 35 U.S.C. 154(b) by 262 days.

(21) Appl. No.: 10/216,456

(22) Filed: Aug. 9, 2002

(65) Prior Publication Data
US 2004/0094860 A2 May 20, 2004

Related U.S. Application Data

(60) Division of application No. 09/257,648, filed on Feb. 25, 1999, now Pat. No. 6,432,339, which is a continuation-in-part of application No. 08/997,966, filed on Dec. 24, 1997, now Pat. No. 6,099,289, which is a continuation-in-part of application No. 08/920,188, filed on Aug. 25, 1997, now abandoned.

(51) Int. Cl.
*B29C 41/28* (2006.01)
*B29C 43/48* (2006.01)
(52) U.S. Cl. .................. 264/167; 264/172.19; 425/115; 425/363; 425/471; 425/814
(58) Field of Classification Search ................ 425/115, 425/363, 471, 814; 264/167, 171.13, 172.19
See application file for complete search history.

(56) References Cited

U.S. PATENT DOCUMENTS

| 2,511,402 | A | * | 6/1950 | Firing |
| 3,098,262 | A | | 7/1963 | Wisotzky |
| 3,267,191 | A | | 8/1966 | Williams et al. ............ 264/166 |
| 3,594,863 | A | | 7/1971 | Erb |
| 3,594,865 | A | | 7/1971 | Erb |

(Continued)

FOREIGN PATENT DOCUMENTS

EP   0891 724 A2   10/1997

(Continued)

OTHER PUBLICATIONS

Patent Abstracts of Japan entitled "Equipment For Producing Film With Transferred Rough Surface", Publication No. 54139966; Publication Date Oct. 30, 1979 (1 pg).

*Primary Examiner*—James P. Mackey
(74) *Attorney, Agent, or Firm*—Fish & Richardson P.C.

(57) ABSTRACT

Several methods and machines for continuously forming a fastener product having an array of fastener elements extending from a continuous, sheet-form base, employing a mold belt on which the sheet-form base of the product is formed and from which it is subsequently stripped. The belt defines an array of cavities extending from its outer surface, for molding either the array of fastener elements or an array of preform stems that are subsequently reformed into the fastener elements. In some cases the cavities are blind, such as for forming hook-type fastener elements; in other cases, the cavities extend through the belt, such as for forming mushroom-type fastener elements. Various belt constructions and fastener element shapes are also disclosed.

82 Claims, 7 Drawing Sheets

U.S. PATENT DOCUMENTS

| | | | |
|---|---|---|---|
| 3,595,059 A | 7/1971 | Erb | |
| 3,723,585 A * | 3/1973 | Nussbaum | 264/46.6 |
| 3,752,619 A | 8/1973 | Menzin et al. | 423/134 |
| 3,762,000 A | 10/1973 | Menzin et al. | 24/204 |
| 3,801,245 A | 4/1974 | Erb | |
| 3,843,763 A | 10/1974 | Coll-Palagos | |
| 4,050,873 A * | 9/1977 | Brumlik et al. | |
| 4,096,225 A * | 6/1978 | Kowalski | 264/167 |
| 4,116,594 A | 9/1978 | Leanna et al. | |
| 4,162,757 A * | 7/1979 | Lemelson | 228/1.1 |
| 4,431,399 A * | 2/1984 | Moertel | 425/545 |
| 4,461,738 A * | 7/1984 | Russell | 264/145 |
| 4,636,161 A | 1/1987 | Raley et al. | |
| 4,725,221 A | 2/1988 | Blanz | |
| 4,775,310 A * | 10/1988 | Fischer | 425/308 |
| 4,794,028 A | 12/1988 | Fischer | |
| 5,057,259 A * | 10/1991 | Parmelee | 264/166 |
| 5,077,870 A * | 1/1992 | Melbye et al. | 24/452 |
| 5,240,666 A | 8/1993 | Schnyder et al. | 264/175 |
| 5,554,333 A * | 9/1996 | Fujiki | 264/284 |
| 5,575,961 A * | 11/1996 | Kuwabara et al. | 264/1.33 |
| 5,641,448 A * | 6/1997 | Yeung et al. | 264/401 |
| 5,749,129 A * | 5/1998 | Murasaki et al. | 24/452 |
| 5,781,969 A * | 7/1998 | Akeno et al. | |
| 5,884,374 A | 3/1999 | Clune | 24/446 |
| 6,132,660 A * | 10/2000 | Kampfer | |
| 6,163,939 A * | 12/2000 | Lacey et al. | 24/452 |
| 6,287,665 B1 | 9/2001 | Hammer | |
| 6,368,097 B1 * | 4/2002 | Miller et al. | |

FOREIGN PATENT DOCUMENTS

WO    WO 98/20767    5/1998

\* cited by examiner

CONTINUOUS MOLDING OF FASTENER PRODUCTS

CROSS-REFERENCE TO PENDING APPLICATIONS

This application is a divisional (and claims the benefit of priority under 35 USC 120) of U.S. application Ser. No. 09/257,648, filed Feb. 25, 1999, now U.S. Pat. No. 6,432,339, which is a continuation-in-part of U.S. application Ser. No. 08/997,966, filed Dec. 24, 1997, now U.S. Pat. No. 6,099,289, which is a continuation-in-part of U.S. application Ser. No. 08/920,188, filed Aug. 25, 1997, now abandoned.

BACKGROUND OF THE INVENTION

This invention relates to the continuous molding of fastener products, such as those having a multiplicity of miniature fastening elements extending from a common sheet-form base.

Touch fastener products have arrays of miniature fastener elements (for instance, hook-shaped or mushroom-shaped elements) extending from a common base. Typically, in order to be capable of engaging a loop fiber or another fastener element, these fastener elements have overhanging "crooks", such as the hook portion of a hook-shaped element or the underside of the head of a mushroom-shaped element. These crooks snag and retain loop fibers, for instance, to form a fastening, but can be challenging to mold in their fully functional form in non-opening mold cavities.

One solution for continuously molding such fastener elements for touch fasteners and other products was disclosed by Fischer in U.S. Pat. No. 4,794,028 (the full disclosure of which is hereby incorporated herein by reference as if fully set forth). In commercial implementations of his solution, a cylindrical, rotating mold roll is composed of a large number (e.g., thousands) of thin, disk-shaped mold plates (or rings) and spacer plates which are stacked concentrically about a central barrel. Extending inwardly from the periphery of the mold plates are cavities for molding the hook elements. Molten resin is introduced to the rotating mold roll and forced into the cavities to form the fastener elements while a layer of the resin on the circumference of the roll forms the integral strip-form base. The mold roll is cooled (e.g., by circulating a liquid coolant through the barrel) to sufficiently solidify the fastener elements to enable them to be stripped from their cavities before making a complete revolution about the mold roll. Thus, in prior implementations of the Fischer process the production speeds obtainable for a given diameter mold roll have been limited by the required "residence time" of the cooling fastener elements in their cavities to enable successful withdrawal. Over-chilling the mold roll to reduce the required residence time can impede proper filling of the cavities by solidifying the resin as it is forced into the cavities.

Another implementation of the general Fischer process, also using stacked mold plates in the form of a multi-plate mold roll apparatus for continuously molding fastener products is described by Murasaki et al. in U.S. Pat. No. 5,441,687.

Multi-plate mold rolls are more prone to bending deflection caused by molding pressures than solid rolls of similar diameter. Such bending deflection can result in undesirable base thickness variation across the width of the fastener product at higher molding pressures.

In U.S. Pat. No. 3,594,863 George Erb discloses a different method and apparatus for molding hook-type fastener elements without employing a mold roll. Erb forms his hooks in cavities partially defined by grooves cut into a moving belt, by injecting molten nylon against the belt (i.e., from the "hook side" of the resulting product), thereby forming narrow ribbons, each ribbon having only two rows of hooks, one row extending from each of its longitudinal edges. To form a useful sheet of fastener product having an entire two-dimensional array of hooks (i.e., of many rows of hooks), Erb laminates many individual ribbons to a preformed base sheet.

SUMMARY OF THE INVENTION

We have realized that touch fastener products, with either hook-type or mushroom-type fastener elements integrally molded with a solid base and arranged in wide arrays, can be formed in a continuous process by molding the fastener elements and base together on a moving belt defining an entire array of cavities.

According to a first aspect of the invention, a method is provided for continuously forming a fastener product having an array of fastener elements extending from a continuous, sheet-form base. The method includes the steps of:

(1) providing a mold belt defining a two-dimensional array of cavities extending from an outer surface of the belt;

(2) training the mold belt in a loop about first and second rolls;

(3) introducing molten plastic resin to the outer surface of the mold belt;

(4) forcing the plastic resin into the cavities of the belt under pressure in a gap to fill the cavities while forming the sheet-form base of the product on the outer surface of the belt;

(5) solidifying the resin as the resin is carried on the belt; and then (6) stripping the solidified resin from the mold belt, the mold belt continuing along its loop and returning to the gap.

In some embodiments, the cavities of the belt are shaped to mold hook-type fastener elements having distal ends extending toward the sheet-form base. In some other embodiments, the cavities of the belt are shaped to mold mushroom-type fastener elements having heads overhanging the sheet-form base in multiple directions.

Preferably, the cavities of the belt are sized to mold fastener elements of less than about 0.050 inch in total height, as measured from the product base (more preferably, less than about 0.020 inch in total height).

In some embodiments, the mold belt includes a belt-form substrate and plating material deposited upon one side of the substrate in a predetermined pattern to form the fastener element-shaped cavities.

In some cases, the cavities of the mold belt extend only partially through the mold belt.

In some arrangements, the plastic resin is forced into the cavities under pressure at a nip defined between the first roll (which may be driven) and a pressure roll.

In some embodiments, the method also includes cooling the mold belt away from the gap.

In some embodiments, the cavities of the mold belt extend completely through the mold belt.

For some applications, the method also includes timing the mold belt to the first roll such that the cavities of the mold belt align with dimples in the surface of the first roll. The step of forcing plastic resin into the cavities includes filling the dimples of the first roll through the aligned cavities to form fastener element heads while forming corresponding fastener element stems in the aligned belt cavities.

In some other embodiments, the method includes timing the mold belt to the first roll such that the cavities of the mold belt align with protrusions extending from the surface of the first roll. The protrusions extend into the aligned cavities as the resin is forced into the cavities, to form fastener elements with heads defining top recesses formed by the protrusions.

In some configurations, the step of stripping the solidified resin from the mold belt includes passing the belt about the second roll, the second roll having projections arranged to push the resin from the belt cavities. The second roll is timed to the mold belt to align the projections with the belt cavities.

In some cases, the gap is defined adjacent the first roll, such as between the first roll and a pressurized extruder.

In some embodiments, the method includes introducing a backing material to the resin in the gap, whereby the backing material is laminated to one side of the sheet-form base of the product.

In some cases, the method includes cooling the resin as it is carried on the belt.

The mold belt comprises metal in some instances, the cavities forming holes extending through the belt.

In some arrangements, the belt includes solidified resin molded to define the cavities.

In some embodiments, the belt has a series of rigid mold plates, each mold plate having an exposed edge defining a row of the cavities. The mold plates are spaced apart and held together by flexible resin in the form of a continuous belt.

According to a second aspect of the invention, a method is provided for continuously forming a fastener product having an array of fastener elements extending from a continuous, sheet-form base. The method includes the steps of:

(1) providing a mold belt defining an array of cavities extending from an outer surface thereof;

(2) training the mold belt about first and second rolls;

(3) forcing molten plastic resin into the cavities of the belt under pressure to fill the cavities in a pressure region while forming the sheet-form base of the product on the outer surface of the belt;

(4) cooling the resin as the resin is carried on the mold belt; and thereafter (5) stripping the cooled resin from the mold belt at a stripping region spaced apart from the pressure region, the mold belt returning to the pressure region along a predetermined path.

In some cases, the pressure region is defined between a pressurized extruder and a pressure reaction plate. In some other cases, the pressure region is defined between a pair of rolls, the molten resin being introduced to the mold belt under atmospheric pressure before being forced into the cavities in the pressure region.

In some instances, the pressure zone is defined between a pressurized extruder and the first roll, the second roll being disposed diametrically opposite the pressure zone and arranged to apply load to the first roll through a load transfer roll to balance bending loads applied to the first roll by extruder pressure.

According to a third aspect of the invention, a method of continuously forming a fastener product having an array of fastener elements extending from a continuous, sheet-form base, includes the steps of:

(1) providing a mold belt defining an array of holes extending therethrough from one broad surface of the belt to an opposite broad surface of the belt;

(2) in a pressure region, forcing molten plastic resin into the holes of the belt under pressure from the one broad surface while the holes are covered at the opposite broad surface of the belt by a pressure reaction surface, to fill the holes while forming the sheet-form base of the product on the one broad surface of the belt;

(3) solidifying the resin as the resin is carried away from the pressure reaction surface on the mold belt; and thereafter (4) stripping the solidified resin from the mold belt at a stripping region spaced apart from the pressure region.

In some embodiments, the mold belt is in the form of a continuous loop, the mold belt returning to the pressure region from the stripping region.

In some cases, the resin is solidified by being cooled while carried on the belt.

The solidified resin is pushed from the holes of the belt at the stripping region, in some embodiments, by aligned projections extending from a roll about which the belt is trained.

According to a fourth aspect of the invention, a method of making a mold belt for the continuous molding of a fastener product having an array of molded fastener elements extending from a continuous, sheet-form base, includes the steps of:

(1) providing a molding master surface having an array of projecting, male fastener elements extending from the master surface;

(2) casting mold resin about the fastener elements on the mold master surface;

(3) solidifying the mold resin; and then (4) stripping the solidified resin from the mold master surface, leaving an array of female cavities extending into the solidified resin from a surface thereof, the cavities having the shape of the fastener elements of the mold master surface.

In some cases, the resin is cast about reinforcement elements which may comprise metal.

Suitable resins include thermoset materials.

In some embodiments, the fastener elements of the mold master surface are hook-type fastener elements.

In some cases, the step of casting includes sequentially forming longitudinal sections of a flexible mold belt in a section molding cavity, each successive longitudinal section being formed at an end of a previously formed section.

According to a fifth aspect of the invention, a method of making a mold belt for the continuous molding of a fastener product having an array of molded fastener elements extending from a continuous, sheet-form base, includes the steps of:

(1) providing a continuous, flexible, strip-form belt adapted to be trained about multiple rolls; and (2) forming an array of holes through the belt, each hole shaped to form a fastener element having an overhanging head for engaging loops.

In some embodiments, the belt comprises metal, the holes being formed through the metal of the belt by an etching process. The belt may be etched from opposite surfaces of the belt to form holes extending completely through the belt.

In some cases, the holes so formed are shaped to mold hook-type fastener elements.

According to a sixth aspect of the invention, a method of making a mold belt for the continuous molding of a fastener product having an array of molded fastener elements extending from a continuous, sheet-form base, includes the steps of:

(1) providing a series of flat mold plates, each mold plate having an edge and defining a row of fastener element-shaped cavities extending from the edge;

(2) arranging the mold plates in parallel, spaced apart relation, the edge of each mold plate from which its cavities extend facing in a common direction; and (3) injecting elastomeric material into spaces defining between the mold plates to connect the mold plates and form a flexible length of belt.

In some embodiments, the mold plates each define apertures therethrough. The step of injecting includes filling the apertures with the elastomeric material to interconnect elastomeric material on both sides of each mold plate. In some cases, before the step of injecting, reinforcement wire is strung through the apertures of adjacent mold plates, the reinforcement wire being subsequently encapsulated by the elastomeric material.

The method includes, in some cases before the step of injecting, filling the cavities of the mold plates with a removable filler to prevent the cavities from filling with elastomeric material during the injecting step. After the step of injecting, the filler is removed from the cavities.

In presently preferred embodiments, the mold plates are composed of metal and the elastomeric material comprises heat-resistant rubber, silicone or urethane. The mold plates each have a thickness of less than about 0.020 inch, a length of at least about 0.5 inch, and a width, corresponding to mold belt thickness, of between about 0.040 and 0.25 inch, and are spaced apart to define interplate gaps of between about 0.005 and 0.025 inch.

In some cases, each mold plate has a back edge, on a side opposite the cavities, which is exposed on a back side of the belt for transferring heat from the cavities.

According to a seventh aspect of the invention, an apparatus is provided for continuously molding a fastener product having an array of fastener elements integrally molded with and extending from a continuous, strip-form base, the apparatus includes first and second rolls, a flexible mold belt defining an array of fastener element-shaped cavities extending from an outer surface of the belt, the mold belt trained about both the rolls, and a source of molten plastic resin arranged to deliver resin to the mold belt. The apparatus is constructed to force the plastic resin into the fastener element-shaped cavities of the belt under pressure in a gap to mold the array of fastener elements while forming the strip-form base of the product.

Various embodiments of the apparatus of the invention contain one or more of the characteristics described above with respect to the method aspects of the invention.

In some embodiments, the apparatus includes a pressure roll adjacent the first roll, the pressure and first rolls defining therebetween a nip in which the plastic resin is forced into the cavities under pressure.

In some configurations, the apparatus includes a cooling system adapted to cool the belt away from the gap.

Presently preferred belts have a thickness of less than about ⅛ inch (more preferably less than about 0.050 inch, and even more preferably less than about 0.020 inch), and a width of at least about ½ inch (more preferably of at least about 2 inches, and een more preferably of at least about 6 inches), for molding a fastener product of a corresponding width.

In some cases, the mold belt consists essentially of molded thermoset resin.

In some other cases, the mold belt comprises a laminate having a layer of metal and a layer of thermoset resin, the fastener element-shaped cavities being defined in the layer of thermoset resin.

In yet other cases, the mold belt comprises molded thermoset resin and reinforcing elements extending the length of the mold belt. Suitable reinforcing elements include cables, wires, mesh, strips or yarns.

In some embodiments, the mold belt consists essentially of metal, the fastener element-shaped cavities comprising holes extending through the mold belt between two opposite broad sides of the belt.

In some embodiments, the mold belt includes a layer of metal bonded to a layer of elastomeric material, the elastomeric material being sufficiently soft to enable to the elastomeric material to be radially compressed by cavity pressure to locally and temporarily enlarge the effective diameter of the fastener element cavities within the layer of elastomeric material.

Some mold belts include a series of flat mold plates, each mold plate having an edge and defining a row of fastener element-shaped cavities extending from the edge, and elastomeric material separating and interconnecting the mold plates in parallel, spaced apart relation to form a flexible length of belt. The edge of each mold plate from which its cavities extend faces in a common direction.

In some configurations, the mold plates each define apertures through the plate, the apertures filled with the elastomeric material to interconnect elastomeric material on both sides of each mold plate. In some cases, the mold belt includes reinforcement wire extending through the apertures of adjacent mold plates and encapsulated within the elastomeric material.

In presently preferred embodiments, the mold plates are composed of metal. Suitable elastomeric materials include compounds of heat-resistant rubber, silicone or urethane. Preferably, the mold plates each have a thickness of less than about 0.020 inch, a length of at least about 0.5 inch, and a width, corresponding to mold belt thickness, of between about 0.040 and 0.25 inch, and are spaced apart to define interplate gaps of between about 0.005 and 0.025 inch.

In some other embodiments, the mold belt has an array of rigid inserts interconnected by a strip of flexible resin, each insert defining a corresponding cavity of the array of cavities. Presently preferred insert materials include metal. The rigid inserts may extend through the thickness of the mold belt, and each of the cavities may extend through the thickness of the mold belt. In some cases, surfaces of the inserts defining the cavities are of stamped form. The cavities may be shaped to form mushroom-type fastener elements having overhanging heads at the distal ends of stems.

In some embodiments, the source of molten plastic comprises a pressurized extruder. The gap is defined, in some cases, between the first roll and the pressurized extruder, or between the pressurized extruder and a fixed pressure reaction plate.

In some configurations, the apparatus is constructed to introduce a backing material to the resin in the gap, whereby the backing material is laminated to one side of the sheet-form base of the product.

The cavities of the belt are defined, in some embodiments, by etched surfaces.

According to an eighth aspect of the invention, an apparatus is provided for continuously molding a fastener product having an array of mushroom-type fastener elements integrally molded with and extending from a continuous, strip-form base. The apparatus includes first and second rolls; a flexible mold belt defining an array of holes extending through the belt, and the mold belt trained about both the rolls; a source of molten plastic resin arranged to deliver resin to the mold belt; means of stripping the base and preform stems from the belt; and means of reforming resin of a distal end of each preform stem to form an overhanging head on each stem, thereby forming the array of mushroom-type fastener elements. The apparatus is constructed to force the plastic resin into the holes of the belt under pressure in a gap to mold an array of preform stems while forming the strip-form base of the product.

According to a ninth aspect of the invention, an apparatus is provided for continuously molding a fastener product having a wide array of fastener elements extending from a continuous, strip-form base, the apparatus including first and second rolls; a mold belt defining an array of cavities extending from an outer surface of the belt in at least three rows, the mold belt trained about both the first and second rolls; a source of molten plastic resin arranged to deliver resin to the outer surface of the mold belt; means for cooling the resin in the cavities of the belt to solidify the resin while on the belt; and means for stripping the cooled resin from the belt, the fastener elements pulled complete from the belt cavities. The apparatus is constructed to force the plastic resin into the cavities of the belt under pressure to fill the cavities as the continuous base of the product is formed on the outer surface of the mold belt.

Various embodiments of this aspect of the invention contain one or more of the features of above-described embodiments of other aspects of the invention.

In some embodiments, the source of molten plastic resin includes a pressurized extruder.

In some configurations, the extruder is arranged to extruder the resin into the cavities of the mold belt in a gap defined between the first roll and the extruder.

In some other configurations, the extruder is arranged to extrude the resin into the cavities of the mold belt in a gap defined between the extruder and a pressure reaction plate disposed between the first and second rolls.

In some embodiments, the cooling means comprises a fan arranged to force air across the mold belt.

In some embodiments, the cooling means includes coolant circulated through at least one roll about which the mold belt is trained.

In some cases, the cavities of the mold belt are shaped to form fastener elements having overhanging heads.

In some other cases, the cavities of the mold belt are shaped to form fastener element stems. The first roll defines an array of cavities at its peripheral surface shaped to form fastener element heads, and has a series of pins extending from its peripheral surface to engage corresponding holes in the mold belt for timing the belt with respect to the first roll to align the cavities of the mold belt with the cavities of the mold roll to form an array of contiguous fastener element-shaped cavities. The molten plastic resin fills the array of contiguous cavities at the first roll to form the array of fastener elements.

The invention represents a significant improvement over conventional roll-forming machines and techniques, in many respects. By removing the mold cavities from the circumference of a single roll, the cavities can be advantageously circulated through cooling processes. The forming fastener elements are also afforded longer residence times, decreasing the rate at which they must be cooled and enabling greater crystallization during solidification. This can enable, in turn, lower cavity filling pressures even at relatively high production rates. In addition, the invention enables the use of solid rolls which more robustly resist bending loads than multi-plate rolls. The mold belt can be readily removed from the molding apparatus for cleaning and replacement, and is useful for forming, in one simple molding step, complete fastener products having a wide array of fastener elements all extending from a single, continuous, strip-form base. Many of the belt structures featured in the invention are inexpensive enough to produce that they may be considered disposable if their cavities become plugged.

These and other advantages and features will be understood from the following description, drawings and claims.

BRIEF DESCRIPTION OF THE DRAWINGS

FIGS. 8–11, 1–16 and 19 are portions of transverse belt cross-sections, while FIG. 12 is a portion of a longitudinal cross-section of the belt of FIG. 11.

Of the cavity shapes illustrated, those of FIGS. 8–12 and 15 form hook-type fastener elements and those of FIGS. 13, 13A, 14, 16 and 19 form mushroom-type fastener elements.

Figure 16:
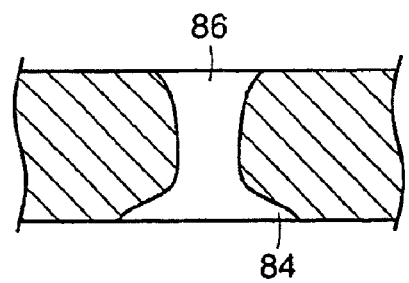
Figure 17:
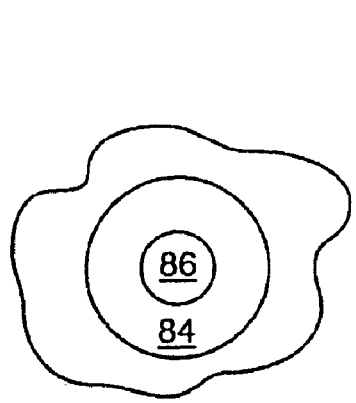
Figure 18:
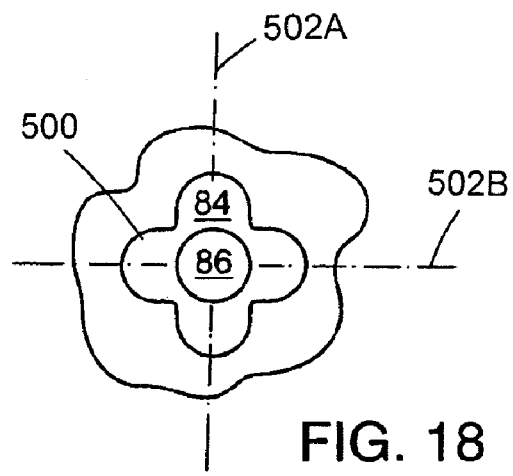

FIGS. 17 and 18 are alternate bottom views of the mold cavity shown in FIG. 16.

Figure 19:
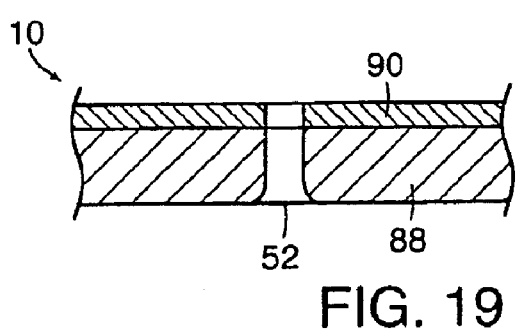
Figure 20:
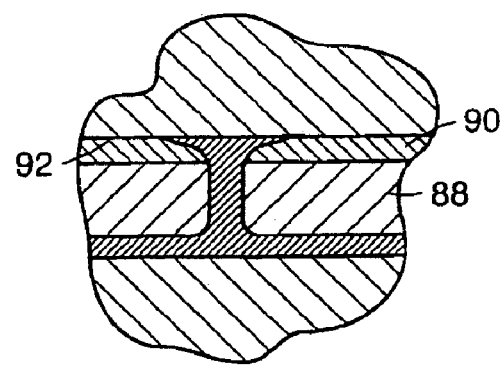

FIG. 20 shows the mold belt of FIG. 19 during molding, with resin filling a typical mold cavity.

Figure 21:
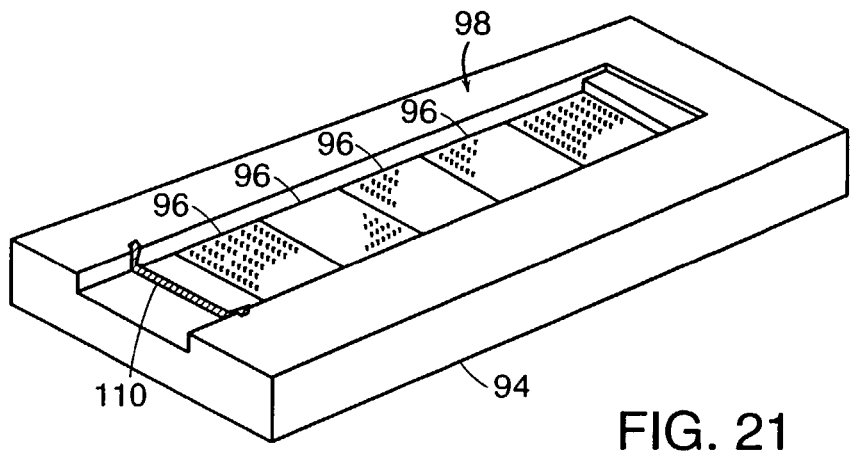

FIG. 21 is a perspective view of the lower portion of a mold for molding a section of a mold belt.

Figure 22:
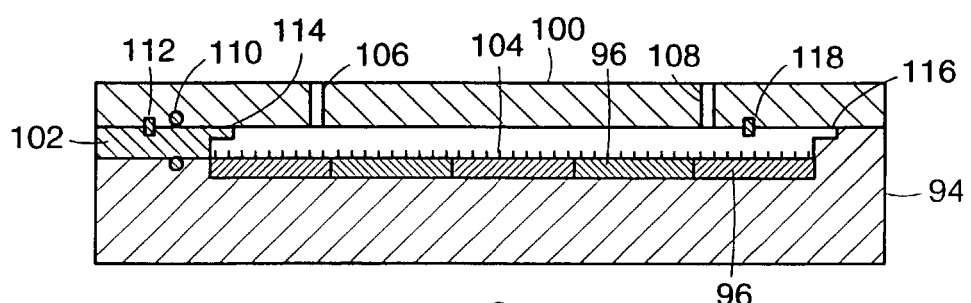
Figure 23:
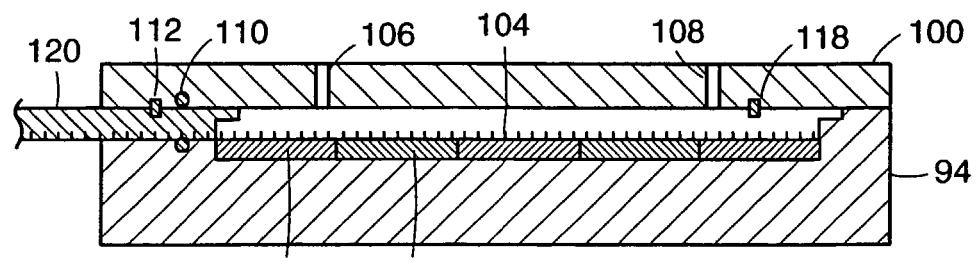

FIGS. 22 and 23 are longitudinal cross-sectional views of the mold portion of FIG. 21, assembled with other mold components to form a mold, ready to mold first and second sections, respectively, of a mold belt.

Figure 24:
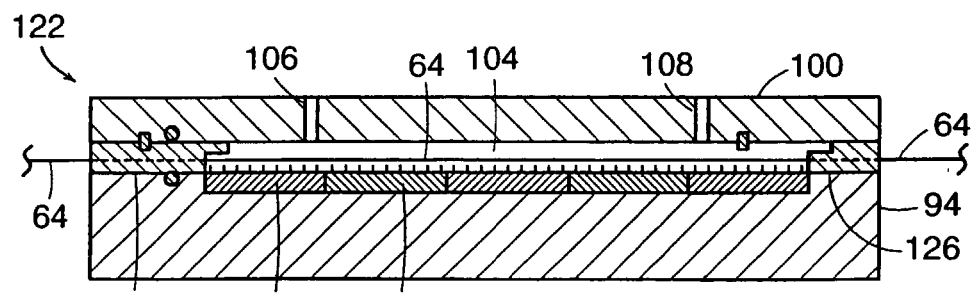

FIG. 24 is a longitudinal cross-sectional view of a mold for molding a section of a mold belt about one or more reinforcement cables.

Figure 25:
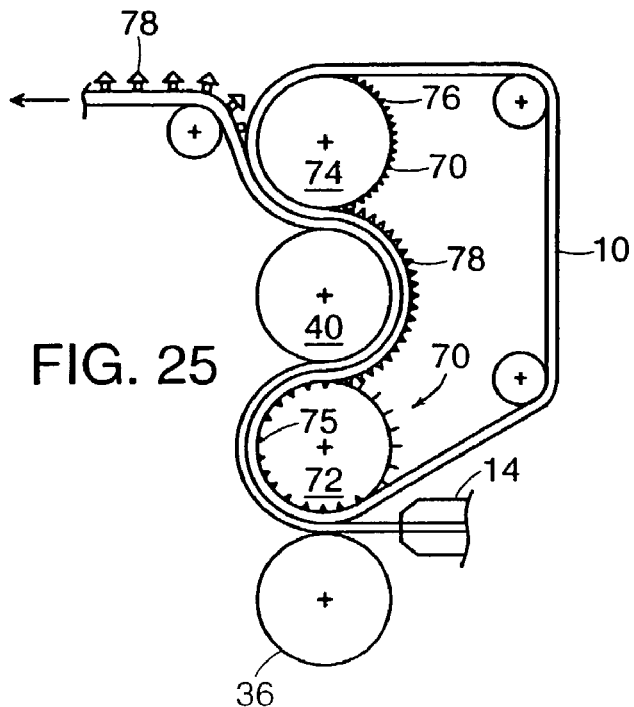

FIG. 25 illustrates a machine configuration for molding fastener elements using a timed mold belt with through holes aligned with dimples on a mold roll, for molding fastener element stems in the belt holes while forming overhanging heads in the roll dimples, while punching the molded elements out of the belt with timed projections on a knock-out roll.

Figure 26:
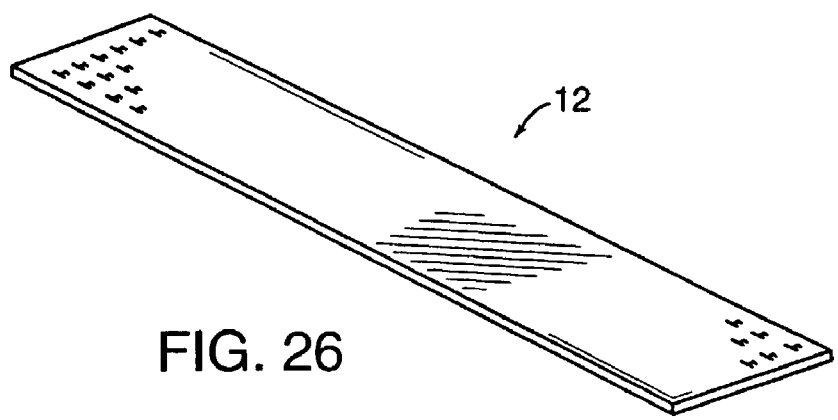

FIG. 26 is a perspective view of a strip-form fastener product having a two-dimensional array of integrally molded hooks extending from a common base.

Figure 27:
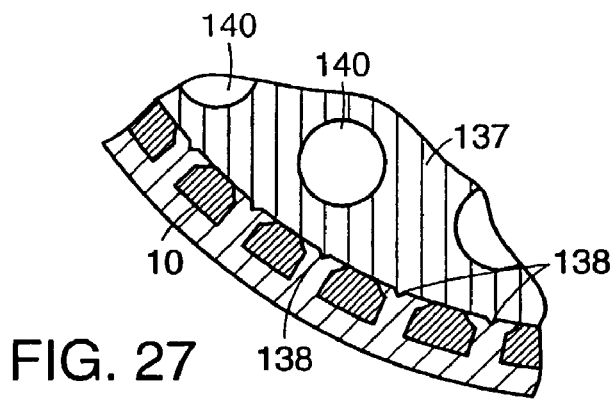

FIG. 27 is a cross-sectional view of a mold belt timed to a roll with projections extending into cavities of the belt, for forming fastener elements with hollow heads.

Figure 28:
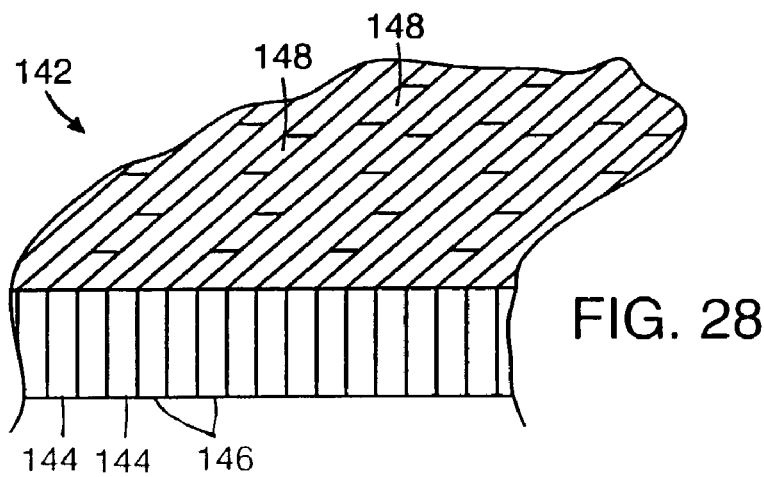

FIG. 28 is a partial perspective view of a mold belt formed of parallel mold plates interconnected with an elastomeric material.

Figure 29:
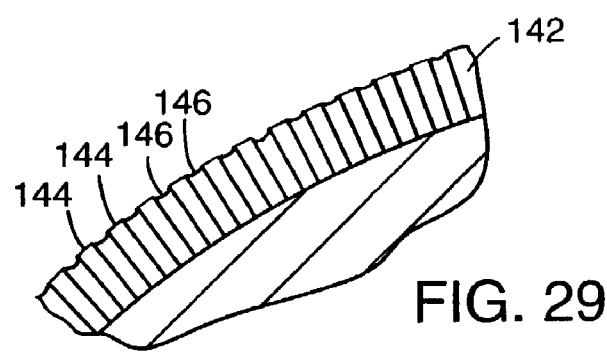

FIG. 29 shows the belt of FIG. 28 curved about a roll.

Figure 30:
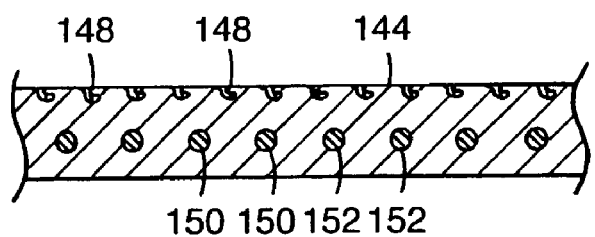

FIG. 30 is a cross-sectional view through one of the mold plates of the belt of FIG. 28.

DESCRIPTION OF EMBODIMENTS

Each of the embodiments shown in FIGS. 1–7 have a recirculating mold belt 10 for continuously molding fastener products 12. The belts and rollers are not drawn to scale, and the thickness of the belt has been exaggerated for purposes of illustration.

In each of the illustrated arrangements, the product 12 formed is a sheet-form touch fastener product having a continuous, broad base of resin from which an entire two-dimensional array of miniature fastener elements extend, as shown in FIG. 26. The resin base of the fastener product, typically only about 0.002 to 0.020 inches thick and anywhere from one to 12 inches or more in width, is formed on one broad surface of belt 10 while the fastener elements are molded in individual mold cavities extending into the belt from the surface on which the base is formed. The arrangement and density of the cavities will vary between embodiments, but is generally the case that there will be between 50 and 2500 cavities per square inch of belt surface, generating an array of fastener elements of a corresponding size and density, with the fastener elements distributed more or less evenly across the width of the product in several rows. Although only 6 parallel rows are illustrated, hundreds or even thousands of rows are formed in some cases. The fastener elements are either of the hook type, having a preferably re-entrant crooked tip extending in a single direction from a stem (or, alternatively, two tips extending in opposite directions), or the mushroom type, having a head extending in multiple directions (in many cases, in all lateral directions) from a stem. The fastener elements so formed are useful for releasably engaging either fibers or other male fastener elements to form releasable fastenings. The hook-type fastener elements retain engaged fibers in their crooks, while the mushroom-type fastener elements snag fibers on the underside of their heads, as is known in the art. Cavities for forming hook-type fastener elements are arranged, in some embodiments, to extend along the longitudinal direction of the product, for forming what are called "machine direction" hooks for applications requiring high peel and shear strengths in a longitudinal direction. In some other embodiments, hook-shaped cavities are arranged to extend (or "point") across the width of the belt, for forming what are called "cross-machine direction" hooks, such as for applications in which the product is to be loaded in a direction transverse to its longitudinal axis. Combinations of machine direction and cross-machine direction hooks are also envisioned, as are hooks extending at various angles to the machine direction.

Figure 1:
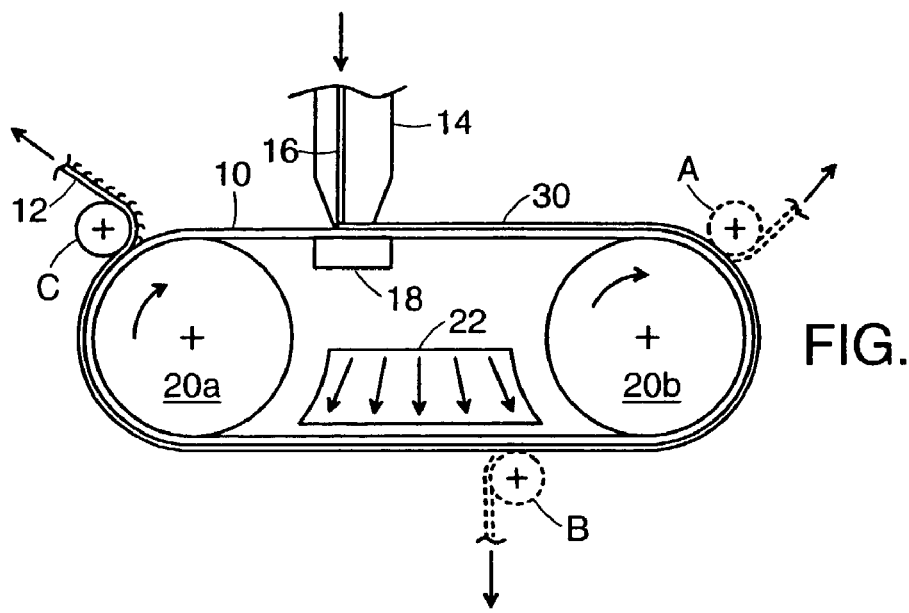
FIGS. 1–7 illustrate several different mold belt routings and machine configurations for molding continuous fastener products on a mold belt, each routing having different advantageous features.

Referring to FIG. 1, an extruder 14 supplies a continuous stream of molten resin 16 under pressure to a board surface of belt 10, which is supported against the extrusion pressure by a rigid plate 18. The distal end of the extruder is configured to form, on its downstream side, a fixed gap with the belt, such that a layer of resin of predetermined thickness is formed on the belt at the extruder. The remainder of the supplied resin is forced into cavities defined within the thickness of the belt, where it conforms to the shape of the cavities and solidifies to form the fastener elements. Thus, the base and fastener elements are formed simultaneously, integrally molded from the same flow of resin, the fastener product thereby being formed complete in a single continuous process. Belt 10 is trained about two driven rolls 20a and 20b which rotate the belt at a relatively constant and controlled speed, ranging anywhere from 25 to 150 lineal feet per minute, corresponding to the production rate of the fastener product. Downstream of extruder 14, belt 10 carries the solidifying resin away from the extruder until it is cooled sufficiently to enable the fastener elements to be stripped from their cavities. As the required residence time for proper cooling will depend upon several factors, including resin chemistry, extrusion temperature, belt structure and temperature, and fastener element geometry, the location of the optimum stripping point along the belt path will depend on these variables and belt speed. At relatively low belt speeds, or when molding smaller fastener elements, the product may be stripped out at point "A". As production speeds increase, the optimum stripping point will move to point "B" and perhaps even to point "C". The extendible length of the belt, as compared to the fixed circumference of standard mold rolls, enables quite long residence times at even relatively high production speeds. Furthermore, the location of the stripping point can be adjusted, even during production, to optimize the residence time as a function of any number of control parameters. The empty belt, stripped of the product, returns to extruder 14 for refilling.

A forced air cooling system 22 blows directly against the non-product surface of belt 10, enhancing the heat transfer from the belt and quickening the solidification of the resin. Alternately, the cooling system can be arranged to blow against the back surface of the cooling product. Further cooling is provided, as needed, by rolls 20a and 20b, for instance by circulating coolant through the rolls. For even more rapid quenching, the belt and carried product can be routed through a coolant bath (not shown).

By enabling longer residence times, even at high production speeds, belt molding allows the product to be cooled at a slower rate than on conventional mold rolls. Slower cooling can enhance crystallization of resin of the fastener elements, resulting in advantageous material properties. This can be particularly important at the surfaces of the fastener elements, where rapid quenching of the resin as chilled mold roll cavities are filling can form a skin layer which, besides increasing the pressure required to completely fill the cavities, tends to have less desirable properties when cooled than resin at the core of the fastener elements which is generally allowed to solidify more slowly. In some applications, pressure block 18 is heated to help to preheat belt 10 before introducing the molten resin.

Figure 2:
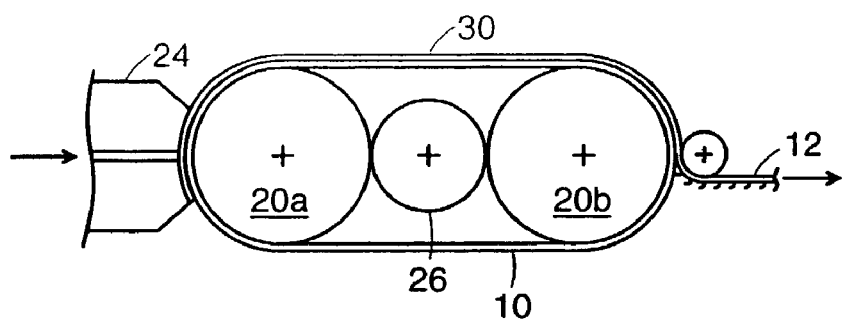

Referring to FIG. 2, extruder 24 is arranged to extrude molten resin into belt 10 against roll 20a, eliminating the need for a separate pressure plate. To help balance the pressure load applied to roll 20b by the extruder, a balance roll 26 transfers load between rolls 20a and 20b, helping to reduce bending deflections of roll 20a that would result in product base thickness variations.

Figure 3:
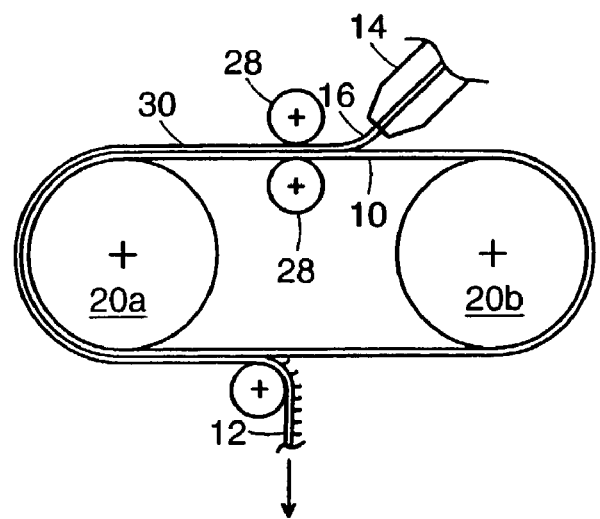

FIG. 3 shows that the molten resin need not be supplied under pressure. In this case, the molten resin is introduced to belt 10 at atmospheric pressure, laid against the surface of the belt. Subsequently, both belt and resin enter a pressure nip defined between a pair of rolls 28 which create sufficient pressure to force some of the resin into the belt cavities to form the fastener elements, leaving a layer 30 of predetermined thickness of the surface of the belt to solidify to form the product base.

Figure 4:
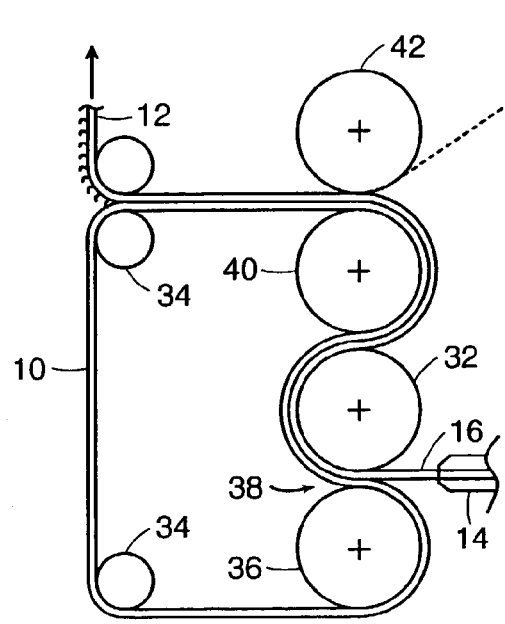

FIG. 4 illustrates a more complex belt routing through a four roll stack similar in arrangement to the roll stack currently employed in commercial embodiments of Fischer's roll-forming method. Fischer's multi-plate mold roll is replaced with a solid roll 32, and belt 10 is routed through all three nips defined by the four roll stack. The belt is also trained about a pair of spaced apart idler rolls 34, such that the belt can be appropriately cooled before re-entering the pressure nip between rolls 32 and 36. The resin 16 is introduced to the belt at the pressure nip 38, where pressure between rolls 32 and 36 cause the cavities to be filled. The belt continues about rolls 32 and 40, at least one which is preferably chilled. Neither nip adjacent roll 40 applies any further pressure to the resin, although the surface of roll 42 may be configured to emboss the back surface of the product base with any desired pattern or indicia, while the fastener elements are protected from damage within the cavities of the belt. Optionally, a backing 44 (such as a fabric with engageable fibers) may be laminated to the back surface of the resin product base between rolls 40 and 42, as shown. While the product is carried about roll 40, its back surface can be treated (e.g., by heat or the application of an adhesive) to prepare it for receiving the backing. The belt continues to carry the cooling product, with the fastener elements disposed within its cavities, until the product 12 is stripped from the belt at one of the idler rolls 34.

Figure 5:
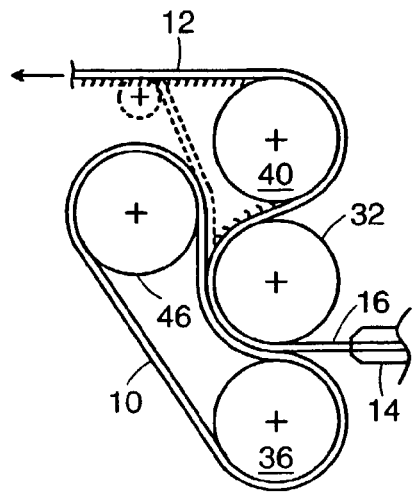

The arrangement of FIG. 5 dispenses with any idler rolls, belt 10 being trained about driven rolls 36 and 46. Tension in the belt produces a normal load between the outer surface of the belt (the surface from which the cavities extend in the case of cavities not extending through the thickness of the belt) and roll 32. As in the embodiment of FIG. 4, resin is forced into the fastener element cavities of the belt by nip pressure between rolls 32 and 36. In this arrangement, roll 32 must generally be cooled sufficiently to solidify the resin while still against roll 32, as the fastener elements are stripped from their cavities relatively soon. Two variations of product routing are shown.

Figure 6:
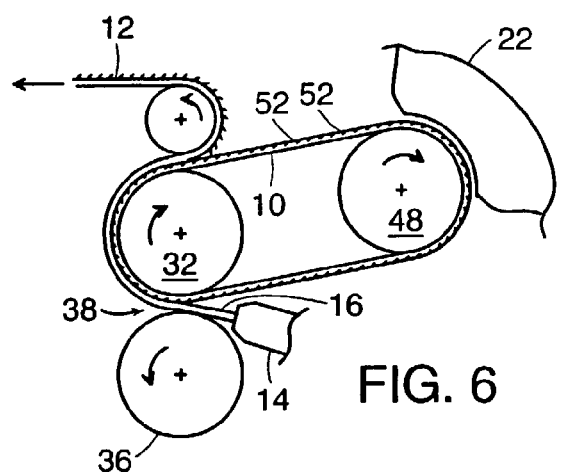

In FIG. 6, belt 10 is trained about driven roll 32 and a spaced apart, auxiliary roll 48 adjacent a belt cooling system 22. Again, the overall length of the mold belt is much greater than the circumference of driven roll 32, increasing the time between resin filling cycles for individual belt cavities 52. Thus, the belt can be adequately cooled before returning to the pressure nip 38.

Figure 7:
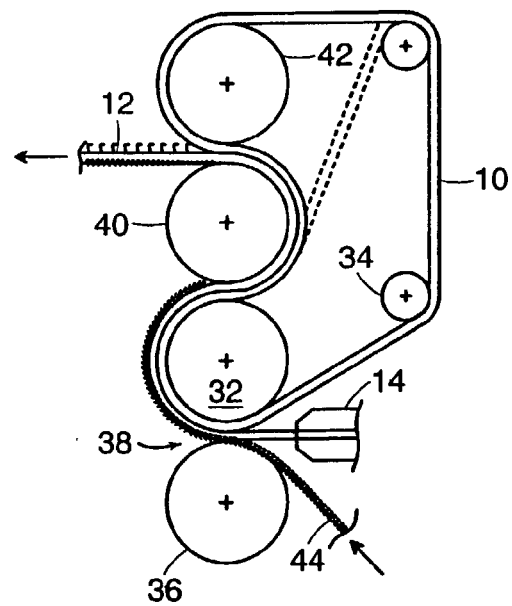

FIG. 7 illustrates a belt routing for use with a four roll stack, in which the belt is introduced to pressure nip 38 adjacent to roll 32. The belt may be routed about upper roll 42, or proceed directly from roll 40 to upper idler roll 34, as shown. A loop fabric material 44 is introduced to the pressure nip along with the belt and resin, being thereby laminated to the back surface of the resin base of the product as the base is formed. Other details regarding effective nip lamination of sheet form materials to the back surfaces of fastener products may be found in Kennedy et al. U.S. Pat. No. 5,260,015, the teachings of which are hereby incorporated by reference. Acceptable loop materials include the non-woven loop product disclosed in U.S. Ser. No. 08/922, 292, filed Sep. 3, 1997 and incorporated herein by reference.

The fact that the curvature of mold belt 10 changes while the cooling resin is carried by the belt can provide advantages in some instances. In FIG. 4, for example, the thickness of the resin base of the product is initially determined by the width of the gap between rolls 32 and 36, at which point the mold belt is locally flat (having no curvature). Immediately upon leaving nip 38, however, the belt assumes the curvature of roll 32. The curvature is reversed about roll 40. Depending on the ratio of the belt thickness to the radius of roll 40, the amount of longitudinal strain applied to the outer surface of the mold belt may be significant, increasing the relative spacing of the fastener element cavities and effectively stretching the cooling product base in the process. This can result, in some situations, in a thinner product base. Where this effect is undesirable, the radius of any curvature followed by the mold belt while carrying the product should be sufficiently large (with respect to the belt thickness). For instance, training a 0.125 inch thick belt about a roll of about 12 inches diameters causes negligible base strain.

Strain in the surface of the curved belt can also be employed to help fill the fastener element cavities. For example, consider the effect of the belt curvature in the configuration of FIG. 7. In pressure nip 38, where the molten resin is introduced to belt 10, the base-forming surface of the belt is under heightened tension (as compared to the nominal belt tension) due to the fact that the belt is locally forced to follow the curvature of roll 32 (which it maintains about approximately half the circumference of roll 32). In this condition, the openings of the cavities at the base-forming surface of the belt are slightly distended (i.e., stretched open). As the belt proceeds about roll 40, the curvature (and its corresponding effect on the cavity openings) is reversed, laterally compressing the resin resident within the cavity openings. This curvature reversal therefore can result in a supplemental resin pressure that can help to force the cooling resin up to the distal ends of the cavities. In the gap between rolls 40 and 42, its curvature subsides and the cavity openings return briefly to a non-stressed condition, opening slightly from their condition about roll 40 and thereby separating from the sides of the cooled fastener elements in anticipation of their removal as the belt continues on around roll 42. Thus, the changing curvature of the mold belt can be used to advantage to help form and strip the molded fastener elements in ways unavailable in fixed-curvature roll molding.

Belts 10 for use in any of the foregoing machine configurations may have any of the following characteristics.

Figure 8:
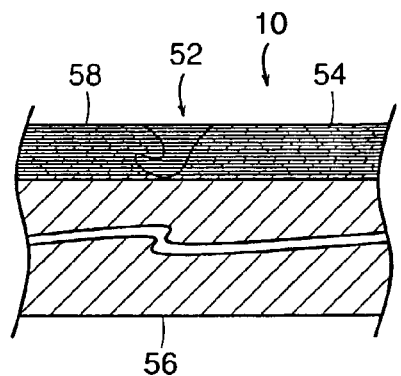

In FIG. 8, the cavities 52 in mold belt 10 are formed by multiple layers of plating 54 applied in successive steps to a belt-form workpiece 56. The material of workpiece 56 and plating 54 are preferably selected to have about the same stiffness for surviving the small amount of flexure that occurs as the belt revolves about the rolls. Useful workpiece materials include 301 stainless steel, for instance. As described in U.S. Ser. No. 08/920,188, photoresist material is applied to the surface of the workpiece to mask areas not to be plated. The thickness of each plating layer is controlled to be about the same as the thickness of the associated masking layer of photoresist material. In successive stages, alternating steps of applying photoresist material and plating the workpiece progressively form fastener element-shaped cavities 52, with the last plating layer forming the outer surface 58 of the finished mold belt.

Figure 9:
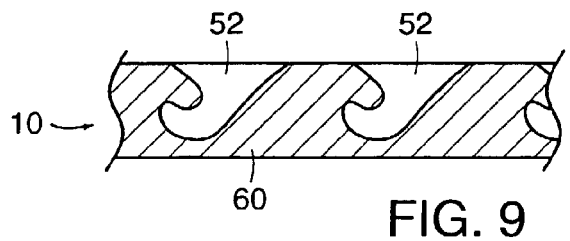
FIGS. 8–16 and 19 illustrate several different mold belt constructions and cavity shapes useful in the machine configurations of FIGS. 1–7.

The mold belt illustrated in FIG. 9 consists entirely of flexible thermoset resin 60, such as an RTV silicone or urethane, which is molded about existing, hook-type fastener elements. After the thermoset resin has cured, the fastener elements are stripped from the thermoset resin, leaving fastener element-shaped cavities 52 defined entirely by the resin of the belt. One method of molding such a belt in longitudinal sections is described below with respect to FIGS. 21–23. Resin 60 should be selected to be sufficiently flexible to withstand the cyclic bending loads applied to the belt, while being rigid enough (i.e., having a sufficiently high durometer) to withstand the molding pressures needed to fill the belt cavities. The molding pressures typically need not be as high as in conventional roll-molding methods (such as taught by Fischer) because the cavity surfaces need not be as cold when receiving the molten resin, and the molten resin itself may have a lower viscosity as applied to the cavities. The lower thermal conductivity of the thermoset resin (as compared to the metal of conventional roll mold plates) helps to keep the filling resin at an elevated temperature during the filling process, allowing more crystallization of the molded resin before it solidifies.

Figure 10:
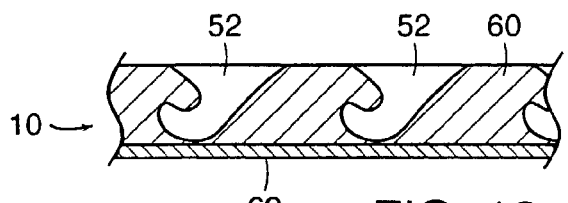

The cavities 52 of the mold belt of FIG. 10 are defined by a layer of molded thermoset material 60, as in FIG. 9, but the belt also includes a layer of metal 62 adjacent the enclosed heads of the fastener element cavities. The metal layer enhances the stiffness and strength of the belt, enabling higher belt tensions, and can enhance heat transfer from the resin cooling in the belt cavities.

Figure 11:
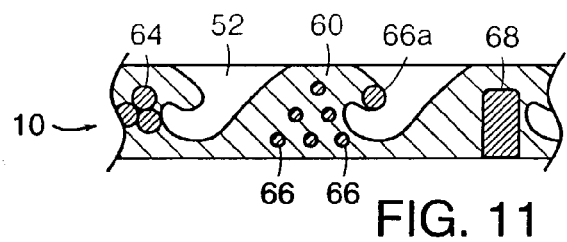
Figure 12:
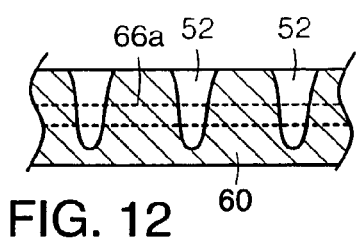

FIGS. 11 and 12 illustrate a belt 10 of reinforced resin. The belt is of thermoset resin 60 molded about hook-type fastener elements and containing metal reinforcement elements running the length of the mold belt. The left of FIG. 11 shows one form of such reinforcement elements, a braided metal cable 64 running in between fastener element cavities. Shown in the middle of FIG. 11 are individual reinforcement wires 66, one of which (wire 66*a*) is disposed within the crook portion of some of the fastener element cavities. The outline of wire 66*a* is shown in FIG. 12, extending through the crook portions of multiple mold cavities. To the right of FIG. 11, a longitudinal metal band 68 is shown, extending between the fastener element cavities and running the length of the mold belt. Whatever the form of the reinforcement elements, whether bands, strips, wires or cables, their function is to enhance the strength of the mold belt. Preferably, they are also arranged to enhance the thermal conductivity of the belt. For instance, metal band 68 is exposed on the back surface of the belt where it may be placed in contact with chilled surfaces along the routing of the belt to accelerate belt cooling.

Figure 13:
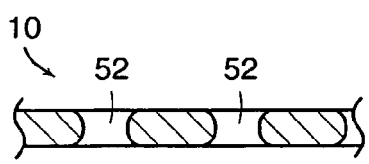

FIG. 13 illustrates a mold belt structure for forming mushroom-type fastener elements integrally with a sheet-form base. Belt 10 is a continuous loop of 0.015 inch thick 301 stainless steel defining an array of 0.015 inch diameter holes 52 through its thickness. Given its thickness and material, belt 10 has a minimum practical bend radius of about 10 inches. Other useful belt materials include other stainless steels, PTFE, beryllium copper, and urethanes. While holes 52 may be formed by any number of methods, a useful flare at each hole opening is readily formed when photochemical etching techniques are employed on an etchable metal belt. To each the holes through the belt, a photoresist mask is applied to both belt surfaces and the belt is etched through holes in the mast. The mask holes on each side of the belt are aligned, such that etchant applied to each side of the belt will etch away belt material to form throughholes. The flared openings on the side of the belt where the product base is formed help to form fillets about the fastener element stems. The flared openings on the side opposite the base are filled with resin that, when stripped from the belt, forms a very thin head at the distal end of each stem. Although the diameter of such a head is not much more than the diameter of its integrally molded stem, even the small amount of overhang is sufficient to snag some loops. Low-lying loops, such as are found in non-wovens, for example, are particularly well snagged by the very thin heads formed by the mold belt of FIG. 13.

Figure 13A:
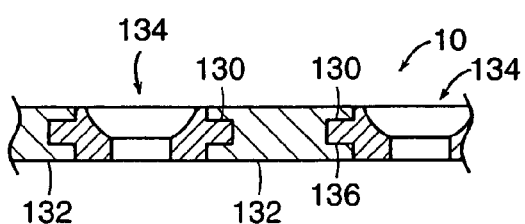

FIG. 13A shows a belt 10 consisting of stainless steel insert grommets 130 embedded in a belt-form substrate of flexible resin 132. Each grommet has a stamped cavity 134 extending through it, with an enlarged region for molding a head overhanging a central stem. A flange 136 is provided around each circular grommet 130 to help to secure it within the surrounding resin. This belt is formed by placing the grommets as inserts within a mold and injecting the resin about them.

Using a mold belt with cavities extending through its thickness (such as shown in FIGS. 13–19) involves somewhat different considerations than molding fastener elements in blind cavities (as are shown in FIGS. 8–12). During filling, the distal end of each cavity must be closed by another surface, for instance. In the machine configuration of FIG. 1, this function is provided by pressure plate 18. In FIGS. 2 and 3, the surface of roll 20*a* and roll 28, respectively, closes off each fastener element cavity as it is filled, forming the outer surface of each fastener element head. In FIGS. 4 and 5, pressure roll 36 locally blocks flow through the outer cavity openings, and roll 32 does so in FIGS. 6 and 7.

Figure 14:
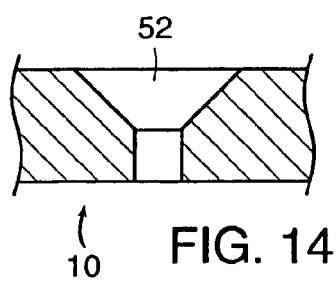

FIG. 14 shows a countersunk holes 52 machined through belt 10 by standard drilling techniques. The nominal hole diameter is about 0.006 inch, and the 90 degree countersink extends the diameter of the hole at its outer opening to about 0.015 inch. To help remove the enlarged heads molded in such cavities without pulling them from their stems, the heads can be punched from their cavities with appropriate protrusions extending from the surface of a stripping roll, the protrusions timed to align with the belt cavities. Such a time arrangement is shown in FIG. 25, for instance, in which mold belt 10 defines an array of through holes 52 as shown in FIG. 13, and a series of timing holes that are engaged by pins 70 extending from mold roll 72 and upper roll 74 to coordinate the position of the belt cavities with both head-forming cavities 75 in the surface of roll 72 and head-releasing protrusions 76 of roll 74. This arrangement forms fastener elements with bulbous heads 78 (shaped by the dimples 75 of roll 72) extending from cylindrical stems (formed in the belt cavities). To push heads 78 through the smaller belt cavities, the heads are each engaged by a corresponding protrusion 76 of roll 74, thus helping to remove the fastener elements complete from belt 10 without separating the heads from their stems. The belt may be formed as a continuous loop, as shown, or may be in the form of a disposable strip which is removed from about the molded fastener elements by a suitable chemical or mechanical process (e.g., by dissolving the strip or by tearing it off of the fastener product). Similarly, if belt 10 has countersunk fastener cavities as shown in FIG. 14, suitable heads may be formed without any dimples 75 formed in roll 72 (and therefore without any need for timing pins 70 on roll 72), the protrusions 76 of roll 74 serving to push the heads formed within the countersunk regions of the belt cavities out of the belt.

As shown in FIG. 27, in another embodiment a belt with enlarged-head fastener element cavities is trained about a roll 137 having protrusions 138 extending radially from its outer surface. Belt 10 is timed to roll 137 to align its fastener element cavities with the protrusions 138 of the roll, whereby a recess is formed by the protrusions in the distal end of each of the fastener elements molded in the belt cavities. Such recesses can reduce the stresses applied to the fastener element heads as they are pulled (or pushed) from their cavities, the recesses providing space for the temporary deflection of the head as it transverses the narrower region of the cavity adjacent the base of the product. The holes 140 shown in roll 137 are for the circulation of coolant to cool the belt and carried resin.

Figure 15:
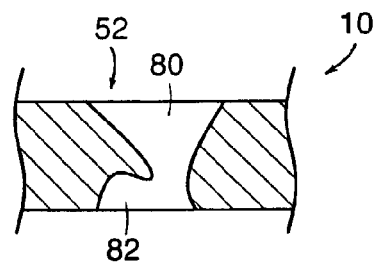

As illustrated in FIG. 15, photochemical etching techniques are also employed to create hook-type fastener element cavities 52 through the thickness of a mold belt 10. To form the stem portion of such a cavity, etchant is applied to a masked surface corresponding to the base-forming surface of the belt, etching away belt material to form the stem portion 80 of the cavity, extending through at least most (if not all) of the thickness of the belt. Subsequently, etchant is applied to the opposite surface (through a suitable mask) to form the overhanging crook portion 82 of each cavity. The result is a cavity shaped to form a hook-type fastener element having a relatively flat upper surface. The flare about the head-forming opening of the cavity creates a thin lip about the permitter of the fastener element head, which helps to snag low-lying fibers.

FIG. 16 shows an etched fastener element cavity which has been selectively etched from both sides to form an extended head-forming cavity 84 of significantly larger overall diameter than the nominal diameter of a contiguous stem-forming cavity 86. As shown in FIGS. 17 and 18, examples of the overall shape of head-forming cavity 84 include simple circles (FIG. 17) and multi-petal configurations (FIG. 18). In FIG. 18, petals 500 extend along lateral axes 502a and 502b. In either case, the shape and overall depth of the head-forming cavity is determined by controlling the etching process and mask aperture shape.

FIG. 19 shows a cylindrical cavity 52 extending through the thickness of a belt 10 which is in the form of a laminate consisting of a metal layer 88 and an elastomeric layer 90. While the metal is sufficiently rigid to withstand cavity-filling pressures without distortion, the durometer of elastomeric layer 90 is sufficiently low that cavity filling pressures laterally compress the elastomeric material, locally increasing the size of the fastener element cavity under pressure to form an overhanging head. For instance, FIG. 20 shows the cavity under pressure and the resulting deformation of elastomeric layer 90. Sufficiently elevated filling pressures can, in some circumstances, slightly lift the belt from the adjacent cavity-stopping surface 92, causing the resin to extend radially a short distance between belt 10 and surfaces 92, further increasing the overall diameter of the molded heads of the fastener elements.

FIG. 21 shows part of a mold 94 for molding belts about hook-type fastener elements (such as the belt of FIG. 9, for instance). In this illustrative belt-forming process, strips of plastic fastener product 96 are affixed to the lower surface of a belt molding cavity 98 with their arrays of fastener elements extending upward into the cavity. As shown in FIG. 22, mold 94 is assembled with an upper plate 100 and an end cavity plug 102 to form an enclosed, elongated cavity 104 for forming a discrete length of mold belt. In some embodiments, multiple strips of fastener product 96, each having hook-type fastener elements arranged to face along their length (i.e., having machine direction hooks) are arranged side-by-side across the floor of cavity 104, such that their hooks face in the cross-machine direction with respect to the length of the cavity (and the length of the as-formed belt). Cavity 104 is evacuated through a vacuum port 106 and then filled with uncured thermoset resin through a fill port 108. An appropriate seal 110 is provided about cavity plug 102, which is held in place by a pin 112 extending from upper plate 100. Plug 102 has a flange 114 which extends into cavity 104 adjacent upper plate 100, mirroring an extension 116 of the mold cavity at the other end of the mold. A pin 118 extends into the mold cavity from the upper plate to form a hole in each belt section which is later used to locate the molded belt section to the mold while an adjacent section is molded. After the first belt section is molded, the mold assembly is opened and the belt section is stripped from the fastener elements of product strips 96.

The end cavity plug of the mold assembly is then replaced with the first molded belt section 120 (FIG. 23), held in place by pin 112 and sealed by seal 110, and a second belt section is molded directly on one end of the first section. This process is repeated until the belt is of a desired length, at which point the two free ends of the belt may be joined by bonding their overlapping flanges.

FIG. 24 shows a belt section mold 122 configured for molding belt sections on one or more continuous loops of reinforcing cable 64 (e.g., for forming the reinforced belt of FIG. 11). To accommodate the cable, about which the belt section is to be formed, the end cavity plugs 124 and 126 are each of the form of two interlocking plates defining therebetween sealed channels for receiving and retaining the parallel cables 64. After the first belt section is molded, it replaces cavity plug 124, and the second belt section is formed. This process is repeated until only one length of belt is yet to be formed about cables 64 to make a continuous belt. For the last molding step, cavity plug 126 is also removed, and the last belt section is molded directly between the two free ends of the pre-molded belt sections.

Metal belts, such as the stainless steel belt shown in FIG. 13, may be formed from strip stock by joining the two ends of a strip, for example, by electron beam welding.

Another belt construction is illustrated in FIGS. 28–30. Referring first to FIG. 28, belt 142 is formed of a series of thin metal mold plates 144, spaced apart and interconnected with elastomeric material 146, such as a heat-resistant rubber, RTV, silicone or urethane compound. Material 146 forms flexible layers separating the rigid mold plates and providing flexibility in the overall belt, and may include a metal powder for enhanced heat conductivity. Each mold plate 144 has a series of mold cavities 148 formed along one longitudinal edge at the outer surface of the belt, for receiving molten resin and forming the array of fastener elements. Cavities 148 may be cut through the thickness of each plate, as shown, in the profile of a hook-type fastener element, or may be etched into one of the broad surfaces of each plate along a longitudinal edge.

As belt 142 is curved about a roll, as is shown in FIG. 29, the elastomeric material at the outer surface of the belt stretches, and the elastomeric material at the inner surface of the belt compresses, as the belt flexes. During flexing, each of the rigid mold plates 144 remains essentially in a radial orientation, the gap between adjacent plates being larger at the outer surface of the belt than at its inner surface. During such flexing, small depression may form between the mold plates at the outer surface of the belt. By applying molten resin to the mold belt in such a flexed condition, the interplate depressions can advantageously form shallow transverse ribs in the surface of the fastener product, running between adjacent transverse rows of fastener elements. The curvature shown in FIG. 29 is exaggerated for purposes of illustration.

Preferably, the mold plates of the mold belt each have a thickness of less than about 0.0200 inch, a length of at least about 0.5 inch, and a width, corresponding to mold belt thickness, of between about 0.040 and 0.25 inch. The mold plates are spaced apart to define interplate gaps, filled with the elastomeric material, of between about 0.005 and 0.025 inch.

To enhance the attachment of mold plates 144 to the elastomeric material 146, a series of holes 150 are provided through each mold plate, as shown in FIG. 30. The elastomeric material fills the holes as the belt is formed, connecting the solidified resin on either side of each mold plate. To add longitudinal strength to the belt, metal reinforcement cables 152 are strung through holes 150 before the elastomeric material is cast about them.

Belt 142 is formed by filling cavities 148 of the individual mold plates 144 with a removable filler material, such as wax, stringing the mold plates on reinforcement cables 152, spacing the mold plates out within a strip-form mold cavity, and injecting the elastomeric material into the spaces between the plates. After the elastomeric material has solidified, the filler material is removed from the fastener element cavities. The elastomeric material is readily formed on section of the belt at a time, in a mold cavity similar to the one shown in FIG. 24.

The above embodiments are for example only, and are noted intended to limit the scope of the invention. Other embodiments and features will be apparent upon closer examination of the drawing, and even more embodiments will be understood by those of ordinary skill upon further reflection, and are intended to be within the scope of the following claims.

What is claimed is:

1. An apparatus for continuously molding a fastener product having an array of fastener elements in multiple rows integrally molded with and extending from a common continuous, strip-form base, the apparatus comprising
   first and second rolls;
   a flexible mold belt defining an array of fastener element-shaped cavities extending from an outer surface thereof in multiple rows, the mold belt trained about both said rolls; and
   a source of molten plastic resin arranged to deliver resin to the mold belt, the apparatus constructed to force the plastic resin into the fastener element-shaped cavities of the belt under pressure in a gap to mold the array of fastener elements in multiple rows while forming the common strip-form base of the product,
   wherein each cavity includes a stem-forming portion extending inwardly from the outer surface, and a head-forming portion at an inner end of the stem-forming portion, the head-forming portion shaped to form a fastener element head of greater lateral extent than the stem-forming portion and multiple, discrete projections extending from the head along different lateral axes.

2. The apparatus of claim 1 wherein the cavities of the belt are shaped to mold hook-shaped fastener elements.

3. The apparatus of claim 1 wherein the cavities of the belt are sized to mold fastener elements of less than about 0.050 inch in total height, as measured from the product base.

4. The apparatus of claim 3 wherein the cavities of the belt are sized to mold fastener elements of less than about 0.020 inch in total height, as measured from the product base.

5. The apparatus of claim 1 wherein the mold belt comprises a belt-form substrate and plating material deposited upon one side of the substrate in a predetermined pattern so as to form the fastener element-shaped cavities.

6. The apparatus of claim 1 wherein the cavities of the mold belt extend only partially through the mold belt.

7. The apparatus of claim 1 further comprising a pressure roll adjacent the first roll, the pressure and first rolls defining therebetween a nip in which the plastic resin is forced into the cavities under pressure.

8. The apparatus of claim 1 further comprising a cooling system adapted to cool the belt away from the gap.

9. The apparatus of claim 1 wherein the mold belt has a thickness of less than about ⅛ inch.

10. The apparatus of claim 9 wherein the mold belt has a thickness of less than about 0.050 inch.

11. The apparatus of claim 10 wherein the mold belt has a thickness of less than about 0.020 inch.

12. The apparatus of claim 1 wherein the mold belt has a width of at least about ½ inch, for molding a fastener product of a corresponding width.

13. The apparatus of claim 12 wherein the mold bet has a width of at least about 2 inches, for molding a fastener product of a corresponding width.

14. The apparatus of claim 13 wherein the mold belt has a width of at least about 6 inches, for molding a fastener product of a corresponding width.

15. The apparatus of claim 1 wherein the mold belt consists essentially of molded thermoset resin.

16. The apparatus of claim 1 wherein the mold belt comprises a laminate having a layer of metal and a layer of thermoset resin, the fastener element-shaped cavities being defined in the layer of thermoset resin.

17. The apparatus of claim 1 wherein the mold belt comprises molded thermoset resin and reinforcing elements extending the length of the mold belt.

18. The apparatus of claim 17 wherein the reinforcing elements comprise cables, wires, mesh, strips or yarns.

19. The apparatus of claim 1 wherein the mold belt consists essentially of metal, the fastener element-shaped cavities comprising holes extending through the mold belt between two opposite broad sides thereof.

20. The apparatus of claim 1 wherein the mold belt comprises a layer of metal bonded to a layer of elastomeric material, the elastomeric material being sufficiently soft to enable the elastomeric material to be radially compressed by cavity pressure to locally and temporarily enlarge the effective diameter of the fastener element cavities within the layer of elastomeric material.

21. The apparatus of claim 1 wherein the mold belt comprises
   a series of flat mold plates, each mold plate having an edge and defining a row of fastener element-shaped cavities extending from the edge; and
   elastomeric material separating and interconnecting the mold plates in parallel, spaced apart relation to form a flexible length of belt, the edge of each mold plate from which its cavities extend facing in a common direction.

22. The apparatus of claim 21 wherein the mold plates each define apertures therethrough, the apertures filled with the elastomeric material to interconnect elastomeric material on both sides of each mold plate.

23. The apparatus of claim 22 wherein the mold belt further comprises reinforcement wire extending through the apertures of adjacent mold plates and encapsulated within the elastomeric material.

24. The apparatus of claim 21 wherein the mold plates are composed of metal.

25. The apparatus of claim 21 wherein the elastomeric material comprises heat-resistant rubber, silicone or urethane.

26. The apparatus of claim 21 wherein the mold plates each have a thickness of less than about 0.020 inch, a length of at least about 0.5 inch, and a width, corresponding to mold belt thickness, of between about 0.040 and 0.25 inch.

27. The apparatus of claim 21 wherein the mold plates are spaced apart to define interplate gaps of between about 0.005 and 0.025 inch.

28. The apparatus of claim 21 wherein each mold plate has a back edge, on a side opposite the cavities, exposed on a back side of the belt for transferring head from the cavities.

29. The apparatus of claim 1 wherein the mold belt comprises an array of rigid inserts interconnected by a strap of flexible resin, each insert defining a corresponding cavity of the array of cavities.

30. The apparatus of claim 29 wherein the rigid inserts comprise metal.

31. The apparatus of claim 29 wherein the rigid inserts extend through the thickness of the mold belt.

32. The apparatus of claim 31 wherein each of the cavities extends through the thickness of the mold belt.

33. The apparatus of claim 29 wherein surfaces of the inserts defining the cavities are of stamped form.

34. The apparatus of claim 29 wherein the cavities are shaped to form mushroom-type fastener elements having overhanging heads at the distal ends of stems.

35. The apparatus of claim 1 wherein the first roll is driven.

36. The apparatus of claim 1 wherein the source of molten plastic comprises a pressurized extruder.

37. The apparatus of claim 36 wherein the gap is defined between the first roll and the pressurized extruder.

38. The apparatus of claim 36 wherein the gap is defined between the pressurized extruder and a fixed pressure reaction plate.

39. The apparatus of claim 1 constructed to introduce a backing material to the resin in the gap, whereby the backing material is laminated to one side of the sheet-form base of the product.

40. The apparatus of claim 1 wherein the gap is defined adjacent the first roll.

41. The apparatus of claim 1 wherein the cavities of the belt are defined by etched surfaces.

42. An apparatus for continuously molding a fastener product having a wide array of fastener elements in multiple rows extending from a common continuous, strip-form base, the apparatus comprising
   first and second rolls;
   a mold belt defining an array of cavities extending from an outer surface thereof in at least three rows, the mold belt trained about both the first and second rolls;
   a source of molten plastic resin arranged to deliver resin to the outer surface of the mold belt, the apparatus constructed to force the plastic resin into the cavities of the belt under pressure to fill the cavities to mold the array of fastener elements in multiple rows as the common continuous base of the product is formed on the outer surface of the mold belt; and
   means for cooling the resin in the cavities of the belt to solidify the resin while on the belt; and
   means for stripping the cooled resin from the belt, the fastener elements pulled complete from the belt cavities,
   wherein each cavity includes a stem-forming portion extending inwardly from the outer surface, and a head-forming portion at an inner end of the stem-forming portion, the head-forming portion shaped to form a fastener element head of greater lateral extent than the stem-forming portion and multiple, discrete projections extending from the head along different lateral axes.

43. The apparatus of claim 42 wherein the source of molten plastic resin comprises a pressurized extruder.

44. The apparatus of claim 43 wherein the extruder is arranged to extrude the resin into the cavities of the mold belt in a gap defined between the first roll and the extruder.

45. The apparatus of claim 43 wherein the extruder is arranged to extrude the resin into the cavities of the mold belt in a gap defined between the extruder and a pressure reaction plate disposed between the first and second rolls.

46. The apparatus of claim 42 wherein the cooling means comprises a fan arranged to force air across the mold belt.

47. The apparatus of claim 42 wherein the cooling means comprises coolant circulated through at least one roll about which the mold belt is trained.

48. The apparatus of claim 42 wherein the cavities of the mold belt are shaped to form fastener elements having overhanging heads.

49. The apparatus of claim 42 wherein the cavities of the mold belt are shaped to form fastener element stems, and wherein the first roll defines an array of cavities at its peripheral surface shaped to form fastener element heads, the first roll having a series of pins extending therefrom to engage corresponding holes in the mold belt for timing the belt with respect to the first roll to align the cavities of the mold belt with the cavities of the mold roll to form an array of contiguous fastener element-shaped cavities, the molten plastic resin filling the array of contiguous cavities at the first roll to form the array of fastener elements.

50. The apparatus of claim 42 wherein the mold belt is timed to the first roll such that the cavities of the mold belt align with protrusions extending from the surface of the first roll, the protrusions extending into the aligned cavities as the resin is forced into the cavities to form fastener elements with heads defining top recesses formed by the protrusions.

51. The apparatus of claim 42 wherein the stripping means comprises an array of projections extending radially from a peripheral surface of the second roll, the second roll also having an array of pins extending radially therefrom for engaging a row of holes in the mold belt to align the cavities of the mold belt with the projections, the projections adapted to push the cooled fastener elements from the cavities of the mold belt.

52. A method of continuously forming a fastener product having an array of fastener elements extending from a continuous, sheet-form base, the method comprising
   providing a continuous mold substrate defining an array of holes extending completely through the substrate from an outer surface of the substrate to an inner surface of the substrate, the holes each forming a mold cavity for molding a discrete fastener element extending from a base formed on the outer surface of the substrate, each cavity including a stem-forming portion extending inwardly from the outer surface, and a head-forming portion at an inner end of the stem-forming portion, the head-forming portion shaped to form a fastener element head of greater lateral extent than the stem-forming portion and, extending from the head in multiple directions, discrete projections for snagging fibers;
   introducing molten plastic resin to the outer surface of the mold substrate;
   forcing the plastic resin into the cavities under pressure in a gap to fill the cavities while forming the sheet-form base of the product on the outer surface of the mold substrate;
   solidifying the resin as the resin is carried on the mold substrate; and then
   stripping the solidified resin from the mold substrate.

53. The method of claim 52 wherein the head-forming portion is bounded by a substantially flat surface distal from the outer surface of the substrate.

54. The method of claim 52 wherein the head-forming portion is shaped to form four head projections extending laterally from the head in four discrete directions.

55. The method of claim 52 wherein the mold substrate comprises a flexible belt.

56. The method of claim 52 wherein the cavities are sized to mold fastener elements of less than about 0.050 inch in total height, as measured from the base.

57. The method of claim 52 wherein the substrate comprises a layer of a first material in which the stem-forming cavity portions are defined, and a layer of a second material in which the head-forming cavity portions are defined.

58. The method of claim 52 wherein the gap comprises a nip between counter-rotating rolls.

59. The method of claim 52 wherein the gap is defined between the mold substrate and a pressurized extruder.

60. The method of claim 52 further comprising introducing a backing material to the resin of the substrate, thereby laminating the backing material to one side of the sheet-form base of the product.

61. The method of claim 60 wherein the backing material is introduced to the resin in the gap, the pressure in the gap aiding lamination of the backing material.

62. An apparatus for continuously molding a fastener product having an array of fastener elements integrally molded with and extending from a continuous strip form base, the apparatus comprising
a continuous mold substrate cyclable through a pressure region, the mold substrate defining an array of holes extending completely through the substrate from an outer surface of the substrate to an inner surface of the substrate, the holes each forming a mold cavity for molding a discrete fastener element extending from a base formed on the outer surface of the substrate, each cavity including a stem-forming portion extending inwardly from the outer surface, and a head-forming portion at an inner end of the stem-forming portion, the head-forming portion shaped to form a fastener element head of greater lateral extent than the stem-forming portion and, extending from the head in multiple directions, discrete projections for snagging fibers;
a source of molten resin positioned to direct molten resin onto the outer surface of the substrate and into the pressure region, where the molten resin is forced into the head-forming portions of the cavities through their respective stem-forming portions, to form the fastener elements; and
a fastener product stripper positioned downstream of the molten resin source and adapted to strip the molded fastener product from the mold substrate.

63. A method of continuously forming a fastener product having an array of fastener elements extending from a continuous, sheet-form base, the method comprising
providing a continuous mold substrate defining an array of holes extending inwardly from an outer surface of the substrate, the holes each forming a mold cavity for molding a discrete fastener element extending from a base formed on the outer surface of the substrate, each cavity including a stem-forming portion extending inwardly from the outer surface, and a head-forming portion at an inner end of the stem-forming portion, the head-forming portion bounded by a substantially flat surface distal from the outer surface of the substrate and shaped to form a fastener element head of greater lateral extent than the stem-forming portion and, extending from the head in multiple directions, discrete projections for snagging fibers;
introducing molten plastic resin to the outer surface of the mold substrate;
forcing the plastic resin into the cavities under pressure in a gap to fill the cavities while forming the sheet-form base of the product of the outer surface of the mold substrate;
solidifying the resin as the resin is carried on the mold substrate; and then
stripping the solidified resin from the mold substrate.

64. The method of claim 63 wherein the head-forming portion is shaped to from four head projections extending laterally from the head in four discrete directions.

65. The method of claim 63 wherein the mold substrate comprises a flexible belt.

66. The method of claim 63 wherein the cavities are sized to mold fastener elements of less than about 0.050 inch in total height, as measured from the base.

67. The method of claim 63 wherein the substrate comprises a layer of a first material in which the stem-forming cavity portions are defined, and a layer of a second material in which the head-forming cavity portions are defined.

68. The method of claim 63 wherein the gap comprises a nip between counter-rotating rolls.

69. The method of claim 63 wherein the gap is defined between the mold substrate and a pressurized extruder.

70. The method of claim 63 further comprising introducing a backing materials to the resin on the substrate, thereby laminating the backing material to one side of the sheet-form base of the product.

71. The method of claim 70 wherein the backing material is introduced to the resin in the gap, the pressure in the gap aiding lamination of the backing material.

72. A method of continuously forming a fastener product having an array of fastener elements extending from a continuous, sheet-form base, the method comprising
providing a continuous mold substrate having layers of first and second materials and defining an array of holes extending upwardly from an outer surface of the substrate, the holes each forming a mold cavity for molding a discrete fastener element extending from a base formed on the outer surface of the substrate, each cavity including a stem-forming portion defining in the layer of first material and extending inwardly from the outer surface, and a head-forming a portion defined in the layer of second material at an inner end of the stem-forming portion, the head-forming portion shaped to form a fastener element head of greater lateral extent than the stem-forming portion and, extending from the head in multiple directions, discrete projections for snagging fibers;
introducing molten plastic resin to the outer surface of the mold substrate;
forcing the plastic resin into the cavities under pressure in a gap to fill the cavities while forming the sheet-form base of the product on the outer surface of the mold substrate;
solidifying the resin as the resin is carried on the mold substrate; and then
stripping the solidified resin from the mold substrate.

73. The method of claim 72 wherein the head-forming portion is bounded by a substantially flat surface distal from the outer surface of the substrate.

74. The method of claim 72 wherein the head-forming portion is shaped to form four head projections extending laterally from the head in four discrete directions.

75. The method of claim 72 wherein the mold substrate comprises a flexible belt.

76. The method of claim 72 wherein the cavities are sized to mold fastener elements of less than about 0.050 inch in total height, as measured from the base.

77. The method of claim 72 wherein the gap comprises a nip between counter-rotating rolls.

78. The method of claim 72 wherein the gap is defined between the mold substrate and pressurized extruder.

79. The method of claim 72 further comprising introducing a backing material to the resin on the substrate, thereby laminating the backing material to one side of the sheet-form base of the product.

80. The method of claim 79 wherein the backing material is introduced to the resin in the gap, the pressure in the gap aiding lamination of the backing material.

81. An apparatus for continuously molding a fastener product having an array of fastener elements integrally molded with and extending from a continuous, strip-form base, the apparatus comprising
 first and second rolls;
 a flexible mold belt defining an array of fastener element-shaped cavities extending from an outer surface thereof, the mold belt trained about both said rolls; and
 a source of molten plastic resin arranged to deliver resin to the mold belt, the apparatus constructed to force the plastic resin into the fastener element shaped cavities of the belt under pressure in a gap to mold the array of fastener elements while forming the strip-form base of the product, wherein each cavity includes a stem-forming portion extending inwardly from the outer surface, and a head-forming portion at an inner end of the stem-forming portion, the head-forming portion shaped to form a fastener element head of greater lateral extent than the stem-forming portion and multiple, discrete projections extending from the head along different lateral axes, and wherein the mold belt consists essentially of metal, the fastener element-shaped cavities comprising holes extending through the mold belt between two opposite broad sides thereof.

82. An apparatus for continuously molding a fastener product having a wide array of fastener elements extending from a continuous, strip-form base, the apparatus comprising
 first and second rolls;
 a mold belt defining an array of cavities extending from an outer surface thereof in at least three rows, the mold belt trained about both the first and second rolls;
 a source of molten plastic resin arranged to deliver resin to the outer surface of the mold belt, the apparatus constructed to force the plastic resin into the cavities of the belt under pressure to fill the cavities as the continuous base of the product is formed on the outer surface of the mold belt; and
 means for cooling the resin in the cavities of the belt to solidify the resin while on the belt; and
 means for stripping the cooled resin from the belt, the fastener elements pulled complete from the belt cavities, wherein each cavity includes a stem-forming portion extending inwardly from the outer surface, and a head-forming portion at an inner end of the stem-forming portion, the head-forming portion shaped to form a fastener element head of greater lateral extent than the stem-forming portion and multiple, discrete projections extending from the head along different lateral axes, and wherein the stripping means comprises an array of projections extending radially from a peripheral surface of the second roll, the second roll also having an array of pins extending radially therefrom for engaging a row of holes in the mold belt to align the cavities of the mold belt with the projections, the projections adapted to push the cooled fastener elements from the cavities of the mold belt.

\* \* \* \* \*

UNITED STATES PATENT AND TRADEMARK OFFICE
CERTIFICATE OF CORRECTION

PATENT NO. : 7,214,334 B2  Page 1 of 1
APPLICATION NO. : 10/216456
DATED : May 8, 2007
INVENTOR(S) : Stephen C. Jens et al.

It is certified that error appears in the above-identified patent and that said Letters Patent is hereby corrected as shown below:

Col. 18 Claim 13, line 1: Replace "bet" with -- belt --.

Col. 18 Claim 28, line 61: Replace "head" with -- heat --.

Col. 19 Claim 42, line 41: Delete "and".

Col. 19 Claim 42, line 45: Replace "complete" with -- completely --.

Col. 21 Claim 63, line 63: Replace "product of" with -- product on --.

Col. 22 Claim 70, line 19: Replace "materials" with -- material --.

Col. 22 Claim 72, line 31: Replace "upwardly" with -- inwardly --.

Col. 22 Claim 72, line 35: Replace "defining" with -- defined --.

Col. 22 Claim 72, line 37: Replace "head-forming a" with -- head-forming --.

Col. 23 Claim 81, line 20: Replace "element shaped" with -- element-shaped --.

Col. 24 Claim 82, line 14: Delete "and".

Col. 24 Claim 82, line 18: Replace "complete" with -- completely --.

Signed and Sealed this

Fifth Day of August, 2008

JON W. DUDAS
*Director of the United States Patent and Trademark Office*